United States Patent [19]
Wilson

[11] 3,953,044
[45] Apr. 27, 1976

[54] BULK MAIL TRANSPORTER

[75] Inventor: James D. Wilson, Newport Beach, Calif.

[73] Assignee: Banner Metals Division of Intercole Automation, Inc., Compton, Calif.

[22] Filed: Mar. 28, 1975

[21] Appl. No.: 562,830

[52] U.S. Cl. .................. 280/33.99 H; 211/150; 280/79.3
[51] Int. Cl.² ............................ B62B 11/00
[58] Field of Search ......... 280/33.99 H, 33.99 R, 280/33.99 S, 33.99 F, 79.1, 79.3; 220/6, 7, 384, 345; 211/178 R, 169.1, 150; 312/138 R, 138 A, 302

[56] References Cited
UNITED STATES PATENTS

| 2,738,201 | 3/1956 | Spears | 280/33.99 H |
| 3,197,224 | 7/1965 | Kappen | 280/33.99 H |
| 3,403,789 | 10/1968 | Morte et al. | 211/150 |
| 3,762,593 | 10/1973 | Beretta | 220/6 |
| 3,861,768 | 1/1975 | Wilson | 280/33.99 H |
| 3,874,689 | 4/1975 | Morgan | 280/33.99 H |

Primary Examiner—M. H. Wood, Jr.
Assistant Examiner—David M. Mitchell
Attorney, Agent, or Firm—Keith D. Beecher

[57] ABSTRACT

A transporter is provided for bulk mail, and the like, in the form of a wheeled rack. The wheeled rack is constructed to have a lower shelf and an intermediate shelf, both of which are hinged to the frame of the rack, and both of which may be turned up to an upright position when the rack is not in use to enable the rack to be nested into other like racks so as to conserve space. The rack also has upper and lower extensible gates which are hinged to the forward edge of the intermediate shelf, and which may be turned to an upright position within the rack with the intermediate shelf when the rack is not in use. The gates, moreover, may be turned and extended to enclose the upper and lower portions of the open front of the rack, and locked in place, when the intermediate shelf is turned down to its operative, load-supporting position.

4 Claims, 5 Drawing Figures

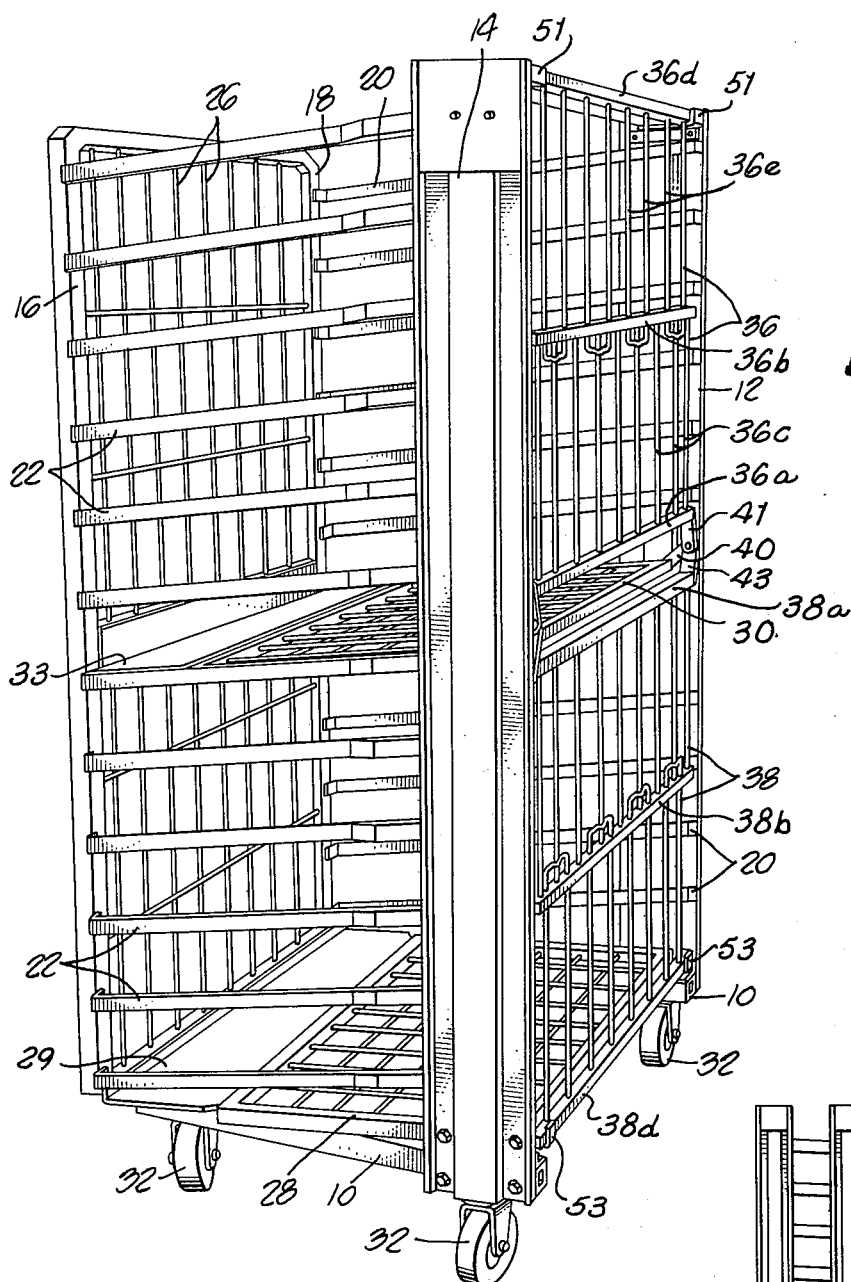
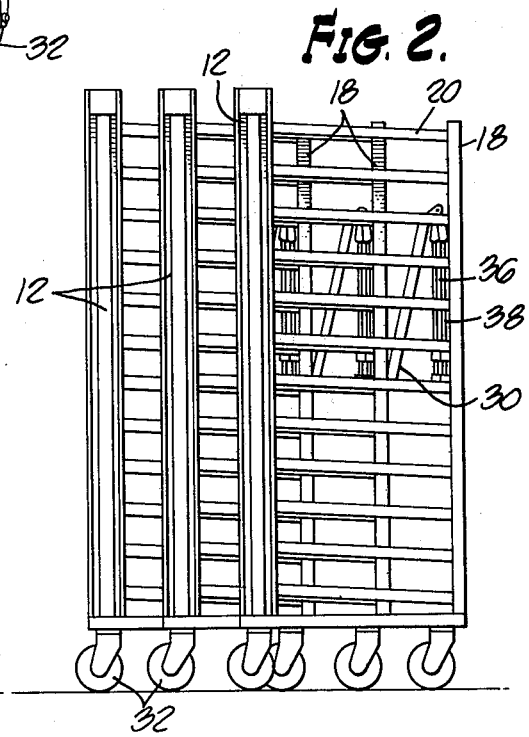
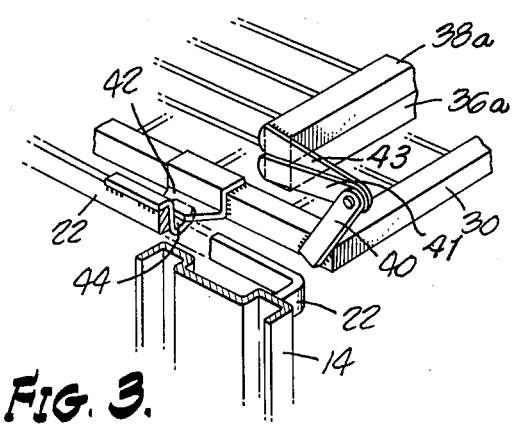
FIG. 1.
FIG. 2.
FIG. 3.

BULK MAIL TRANSPORTER

BACKGROUND OF THE INVENTION

The wheeled rack of the invention is particularly suited for carrying trays or bags of bulk mail between a main post office and sub-station post offices. The wheeled rack is equipped with a bottom shelf and an intermediate shelf for this purpose, both of which may be turned to an upright position, as mentioned above, to permit mutual nesting of the unused racks to conserve space.

The rack of the invention also has upper and lower front gates, as described above, which are hinged to the forward edge of the intermediate shelf, and which may be respectively turned up and down to a vertical position and extended to enclose the open front of the rack when the intermediate shelf is turned down to its horizontal, load-supporting position. The gates may be locked in place as a security measure for the contents of the rack.

The rack of the invention is similar in some respects to the rack described and claimed in U.S. Pat. No. 2,928,681, which issued Mar. 15, 1960 to the present inventor; and in Copending application Ser. No. 477,805, which was filed June 10, 1974 in the name of the present inventor.

BRIEF DESCRIPTION OF THE DRAWINGS

FIG. 1 is a perspective representation of a wheeled rack in accordance with one embodiment of the invention;

FIG. 2 is a side elevation of a plurality of racks, each constructed in accordance with the invention, and showing the manner in which the racks may be nested into one another when not in use;

FIG. 3 is an enlarged fragmentary detail showing the manner in which the front gates of the rack are hinged to the intermediate shelf;

DETAILED DESCRIPTION OF THE ILLUSTRATED EMBODIMENT

Figure 4:
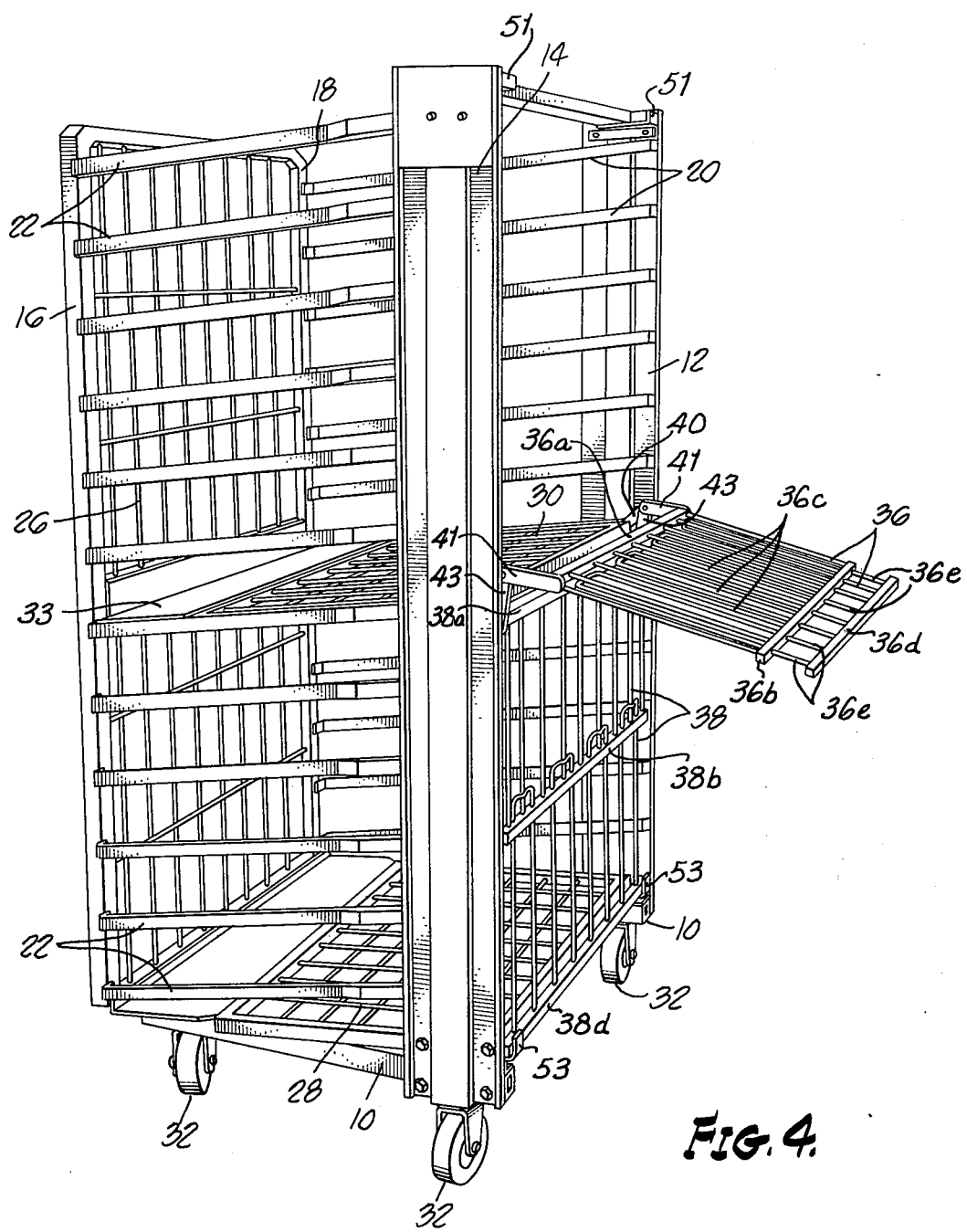
FIG. 4 is a perspective representation of the rack of FIG. 1, showing the lower gate closed, and showing the upper gate in an open position.

The assembly illustrated in the drawing includes a U-shaped lower frame member 10 which defines an open front for the rack and which has a rear member and side members which diverge outwardly from the rear member. Four upright posts are mounted on the U-shaped frame at the respective corners of the rack, these posts being designated 12, 14, 16 and 18 respectively.

A plurality of essentially horizontal struts 20 are welded to the posts 12 and 18, and the struts extend between the posts generally horizontal and spaced and parallel to one another. Likewise, a plurality of generally horizontal struts 22 are welded to the posts 14 and 16, and extend between the posts in parallel relationship with one another. The struts 20 form one of the side walls of the rack, whereas the struts 22 form the second side wall. The side walls diverge outwardly from the rear to the front of the rack. The rack may also be equipped with a wire-formed rear wall 26 as shown.

Figure 5:
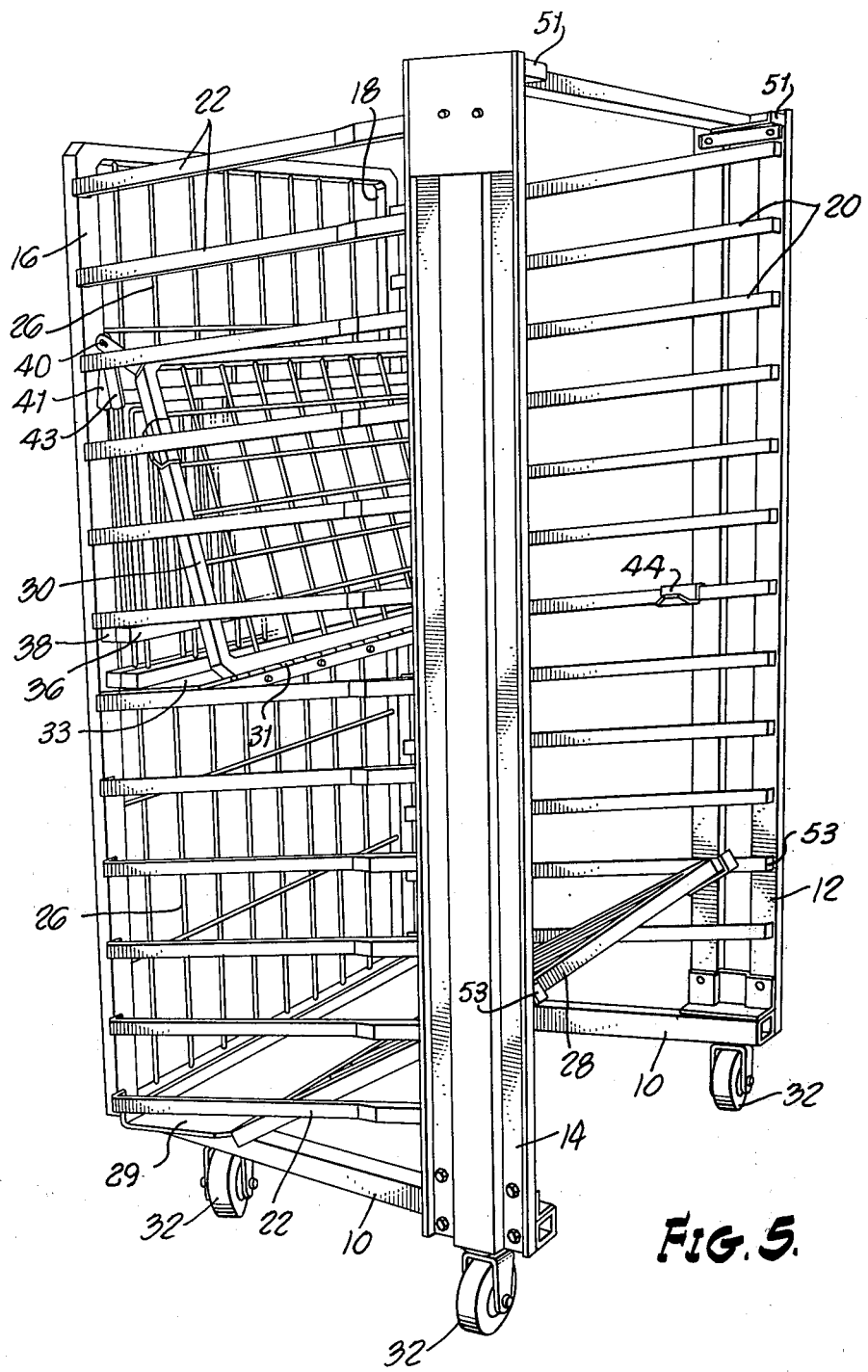
FIG. 5 is a perspective representation of the rack of FIG. 1, showing the shelves and gate turned to their upright positions to condition the rack to receive other similar racks in a nested condition with respect thereto.

The resulting rack has an open front which is somewhat wider than the rear wall 26. The rack also has a lower shelf 28 which is hinged along its rear edge to a bottom section 29. The lower shelf may be turned down to a horizontal load-receiving position, such as shown in FIGS. 1 and 4, or which may be turned up to an upright position such as shown in FIG. 5.

The rack also has an intermediate shelf 30 which likewise is hinged along its rear edge by a hinge 31 (FIG. 5) to an intermediate shelf section 33. The intermediate shelf 30 may be turned down to a horizontal load-supporting position such as shown in FIGS. 1 and 4, or may be turned up to an upright position, such as shown in FIG. 5. The width of the shelves 29 and 30 correspond to the width of the rear wall of the rack, and the shelves are somewhat narrower than the open front. When the shelves 28 and 30 are turned to their upright positions, the rack of FIG. 1 may receive a plurality of similar racks through its open front, as best shown in FIG. 2.

The assembly of FIG. 1 also has a plurality of wheels 32 suspended from the lower frame 10 at the respective corners. The wheels 32 may be the usual type of swivel casters.

An extensible upper gate 36, and an extensible lower gate 38 are pivotally mounted to the forward edge of the intermediate shelf 30 by respective links 41 and 43, which are pivotally coupled to a link 40 at each end of the forward edge of the shelf. When the intermediate shelf 30 is turned down to its load-receiving position, a stud 42 is received in a U-shaped support 44 at each end of the forward edge of the shelf, such as shown in FIG. 3. The support 44 at one end of the shelf is supported on a strut 20, and the support 44 at the other end of the shelf is supported on a strut 20. The gate 36 has a lower cross bar 36a which is secured to the links 41, and it has an intermediate cross bar 36b. A plurality of spaced and parallel rods 36c extend between the lower cross bar 36a and the intermediate cross bar 36b, and these rods serve to hold the cross bars 36a and 36b in their illustrated spaced relationship. The gate 36 also has an upper cross bar 36d. A plurality of rods 36e are attached to cross bar 36d and are slidable in cross bar 36b to permit cross bar 36d to be pulled away from cross bar 36b to extend the gate. The gate 38 has a similar consturction, including cross bars 38a, 38b and 38d. The gates 36 and 38 may be turned up and down to a vertical position, as shown in FIG. 1, and pulled to their extended positions, so as to completely enclose the open front of the assembly, and the gates may be locked in their illustrated positions of FIG. 1 for security reasons. When the gates 36 and 38 are in the positions shown in FIG. 1, the cross bar 36d of gate 36 is received in L-shaped brackets 51 mounted at the upper ends of posts 12 and 14; and the cross bar 38d of gate 38 is received in brackets 53 mounted on the ends of the forward edge of the lower shelf 28.

When the rack assembly is not in use, the gates 36 and 38 may be retracted, as shown in FIGS. 4 and 5, and turned up with the intermediate shelf 30 to the upright position of FIG. 5, so that the other racks may be nested into the rack unimpeded by the gates 36 and 38.

The invention provides, therefore, an improved wheeled rack which is simple and rugged in its construction, and which is particularly suited for transporting bulk mail. The rack has an advantage in that its forward gates may readily be turned and extended to enclose fully the front end of the rack, and locked for security reasons. Moreover, the gates and shelves of the rack may readily be turned to their upright positions, as described above, so as to condition the rack to receive other similar racks in a nested condition with respect thereto so as to conserve space.

While a particular embodiment of the invention has been shown and described, modifications may be made. It is intended in the claims to cover the modifications which come within the spirit and scope of the invention.

What is claimed is:

1. A rack comprising: a lower U-shaped horizontal frame member having a rear member and side members which diverge outwardly from the rear member and defining an open front; a plurality of spaced and parallel upright posts mounted on said frame member at the front and rear thereof; a rectangular-shaped intermediate shelf having a forward edge and a rear edge; hinge means attached to the rear edge of the intermediate shelf and supported on the posts to permit the intermediate shelf to be upwardly turnable to an upright position to permit other like racks to be received in the open front of the rack; and upper and lower gate members individually pivotally mounted to the forward edge of the intermediate shelf and turnable from positions adjacent the intermediate shelf when the intermediate shelf is in its upright position to positions enclosing the open front of the rack when the shelf is turned down to a horizontal load supporting position in which the upper gate encloses the area above the intermediate shelf and the lower gate encloses the area below the intermediate shelf.

2. The rack defined in claim 1, and which includes a rectangular-shaped bottom shelf having a front edge and a rear edge; and hinge means attached to the rear edge of the bottom shelf and supported on the U-shaped horizontal frame member to permit the bottom shelf to be upwardly turnable to an upright position to permit other like racks to be received in the open front of the rack.

3. The rack defined in claim 1, and which includes a plurality of wheels attached to and depending from the lower U-shaped member.

4. The rack defined in claim 1, in which the upper and lower gate members each include intermediate and lower cross bars and a plurality of spaced and parallel rods affixed thereto and extending therebetween to maintain the intermediate and lower cross bars in a fixed spaced and parallel position, and an upper cross bar and a plurality of spaced and parallel rods affixed thereto and extending through the intermediate cross bar in sliding relationship therewith so that the gates are extensible.

* * * * *